(12) United States Patent
Leibovitch et al.

(10) Patent No.: US 10,517,440 B2
(45) Date of Patent: Dec. 31, 2019

(54) GRATING DEVICE AND METHOD OF OPERATING SAME

(71) Applicants: Emily Carol Leibovitch, Washington, DC (US); David William Henri Leibovitch, Washington, DC (US)

(72) Inventors: Emily Carol Leibovitch, Washington, DC (US); David William Henri Leibovitch, Washington, DC (US)

( * ) Notice: Subject to any disclaimer, the term of this patent is extended or adjusted under 35 U.S.C. 154(b) by 128 days.

(21) Appl. No.: 15/680,129

(22) Filed: Aug. 17, 2017

(65) Prior Publication Data
US 2018/0049595 A1 Feb. 22, 2018

Related U.S. Application Data

(60) Provisional application No. 62/377,548, filed on Aug. 20, 2016.

(51) Int. Cl.
*A47J 43/25* (2006.01)

(52) U.S. Cl.
CPC ..................... *A47J 43/25* (2013.01)

(58) Field of Classification Search
CPC ....................................................... A47J 43/25
See application file for complete search history.

(56) References Cited

U.S. PATENT DOCUMENTS

| | | | | |
|---|---|---|---|---|
| 342,341 A * | 5/1886 | Edwards | ............... | A61F 13/105 294/25 |
| 1,016,338 A * | 2/1912 | Lannoye | ................. | A47J 43/25 241/273.1 |
| 1,235,199 A * | 7/1917 | Gavin | ................... | A41D 13/087 15/246 |
| 1,652,544 A * | 12/1927 | Tanquary | ................ | A47J 43/25 269/6 |
| 2,256,098 A * | 9/1941 | Mauldin | ................. | A47L 13/18 15/227 |
| 3,748,792 A | 7/1973 | Lamb | | |
| 3,789,555 A | 2/1974 | Means | | |
| 4,314,724 A * | 2/1982 | Barna | ...................... | A47J 19/16 294/99.2 |
| 5,222,331 A * | 6/1993 | Manor | ................... | B24D 9/085 451/520 |
| 5,885,148 A * | 3/1999 | Vargas | ................. | B24D 15/045 451/523 |
| 6,557,178 B1 | 5/2003 | Hoover | | |
| 6,575,822 B2 | 6/2003 | Lowe et al. | | |
| 8,062,101 B1 | 11/2011 | Friend | | |

(Continued)

*Primary Examiner* — Faye Francis

(57) ABSTRACT

A grating device, a method of operating a grating device, and a device are disclosed. A grating device includes a band being flexible to vary a separation distance between first and second ends of the band, first and second fingerholds respectively located at the first and second ends and configured to receive respective first and second fingers of a user, and a first grating element located on the first side and at the first end. The first and second fingerholds are configured to hold the fingers on the second side of the band such that (i) the separation distance between the first and second ends of the band decreases when the fingers of the user are moved closer to one another, and (ii) the separation distance between the first and second ends of the band increases when the fingers of the user are moved apart from one another.

14 Claims, 3 Drawing Sheets

(56) References Cited

U.S. PATENT DOCUMENTS

| | | | | |
|---|---|---|---|---|
| 8,844,080 B2* | 9/2014 | Stacy | ............... | A47J 43/28 2/163 |
| 8,925,842 B2* | 1/2015 | Juarez | ............... | A47J 43/25 241/168 |
| 10,136,686 B2* | 11/2018 | Savides | ............... | A41D 13/087 |
| 2002/0009966 A1 | 1/2002 | Orr | | |
| 2004/0046073 A1* | 3/2004 | Richardson | ............... | A47J 43/25 241/95 |
| 2006/0200912 A1* | 9/2006 | Jackson | ............... | A01B 1/00 7/110 |
| 2008/0250943 A1* | 10/2008 | Malandain | ............... | A47J 43/25 99/537 |
| 2009/0121062 A1* | 5/2009 | Silver | ............... | A47J 43/25 241/168 |
| 2011/0183589 A1* | 7/2011 | Yu | ............... | B24D 15/04 451/523 |
| 2012/0278964 A1* | 11/2012 | Bormann-Early | ............... | A41D 13/087 2/21 |
| 2014/0283279 A1* | 9/2014 | Pratho | ............... | A41D 13/087 2/163 |
| 2019/0142192 A1* | 5/2019 | Rampersd | ............... | A47G 21/001 |

* cited by examiner

GRATING DEVICE AND METHOD OF OPERATING SAME

CROSS REFERENCE TO RELATED APPLICATION

This application claims the benefit of Provisional U.S. patent application Ser. No. 62/377,548 filed on Aug. 20, 2016, the entire contents of which are incorporated herein by reference.

TECHNICAL FIELD

The present disclosure relates to a grating device and a method of grating, including, more particularly, a grating device configured to be operated using two fingers, and a method of operating such grating device.

BACKGROUND INFORMATION

Known kitchen graters include mechanical graters and electro-mechanical graters. Mechanical graters typically include a grating surface coupled to a handle. These mechanical graters are operated by holding the handle, applying pressure between the grating surface and an item to be grated, and moving the grater relative to the item to be grated. It is typically difficult to maintain adequate pressure between the grating surface and the item to be grated, because of the lack of mechanical advantage due to the distance from the grating surface to the handle held by the user. Moreover, the use of these mechanical graters produces flakes that often fall over a large surface area, and are thus difficult to contain within a limited working space. Electro-mechanical graters typically involve multiple moving parts, which are expensive to manufacture, procure and maintain.

Known devices for sanding or polishing include cloth or paper materials that the user typically holds with one hand and rubs against the surface of an item. These devices typically lack precision and control. Other devices, such as sanding gloves and polishing gloves, afford more precision and control. However, such gloves are cumbersome to put on and remove from the user's hand, typically provide poor breathability, and require large amounts of storage space.

SUMMARY

A grating device is disclosed. The grating device includes a band extending in a longitudinal direction from a first end to a second end, the band possessing a first side and a second side opposing the first side, the first and second sides extending in the longitudinal direction, the band being flexible to vary a separation distance between the first end and the second end, a first fingerhold located at the first end and configured to receive a first finger of a user, a second fingerhold located at the second end and configured to receive a second finger of the user, and a first grating element located on the first side and at the first end of the band. The first and second fingerholds are configured to hold the first and second fingers of the user on the second side of the band such that: (i) the separation distance between the first and second ends of the band decreases when the first and second fingers of the user are moved closer to one another, and (ii) the separation distance between the first and second ends of the band increases when the first and second fingers of the user are moved apart from one another.

A method of operating a grating device is disclosed. The method comprises placing first and second fingers of a user respectively in first and second fingerholds of a grating device. The grating device comprises a band extending in a longitudinal direction from a first end to a second end. The band possesses a first side and a second side opposing the first side, the first and second sides extending in the longitudinal direction. The band is flexible to vary a separation distance between the first end and the second end. The grating device further comprises the first fingerhold located at the first end and configured to receive the first finger of a user, the second fingerhold located at the second end and configured to receive the second finger of the user, and a first grating element located on the first side at the first end of the band. The method further comprises decreasing the separation distance between the first and second ends of the band by moving the first and second fingers of the user closer to one another until the first grating element makes contact with a first surface of an item to be grated, moving the grating device along the surface of the item to be grated, and increasing the separation distance between the first and second ends of the band by moving the first and second fingers of the user apart from one another.

A device is disclosed. The device includes a band extending in a longitudinal direction from a first end to a second end, the band possessing a first side and a second side opposing the first side, the first and second sides extending in the longitudinal direction, the band being flexible to vary a separation distance between the first end and the second end, a first fingerhold located at the first end and configured to receive a first finger of a user, and second fingerhold located at the second end and configured to receive a second finger of the user. The first and second fingerholds are configured to hold the first and second fingers of the user on the second side of the band such that: (i) the separation distance between the first and second ends of the band decreases when the first and second fingers of the user are moved closer to one another, and (ii) the separation distance between the first and second ends of the band increases when the first and second fingers of the user are moved apart from one another.

BRIEF DESCRIPTION OF THE DRAWINGS

Other features and advantages disclosed herein will become more apparent from the following detailed description of exemplary embodiments when read in conjunction with the attached drawings, wherein.

DETAILED DESCRIPTION

Figure 1A:
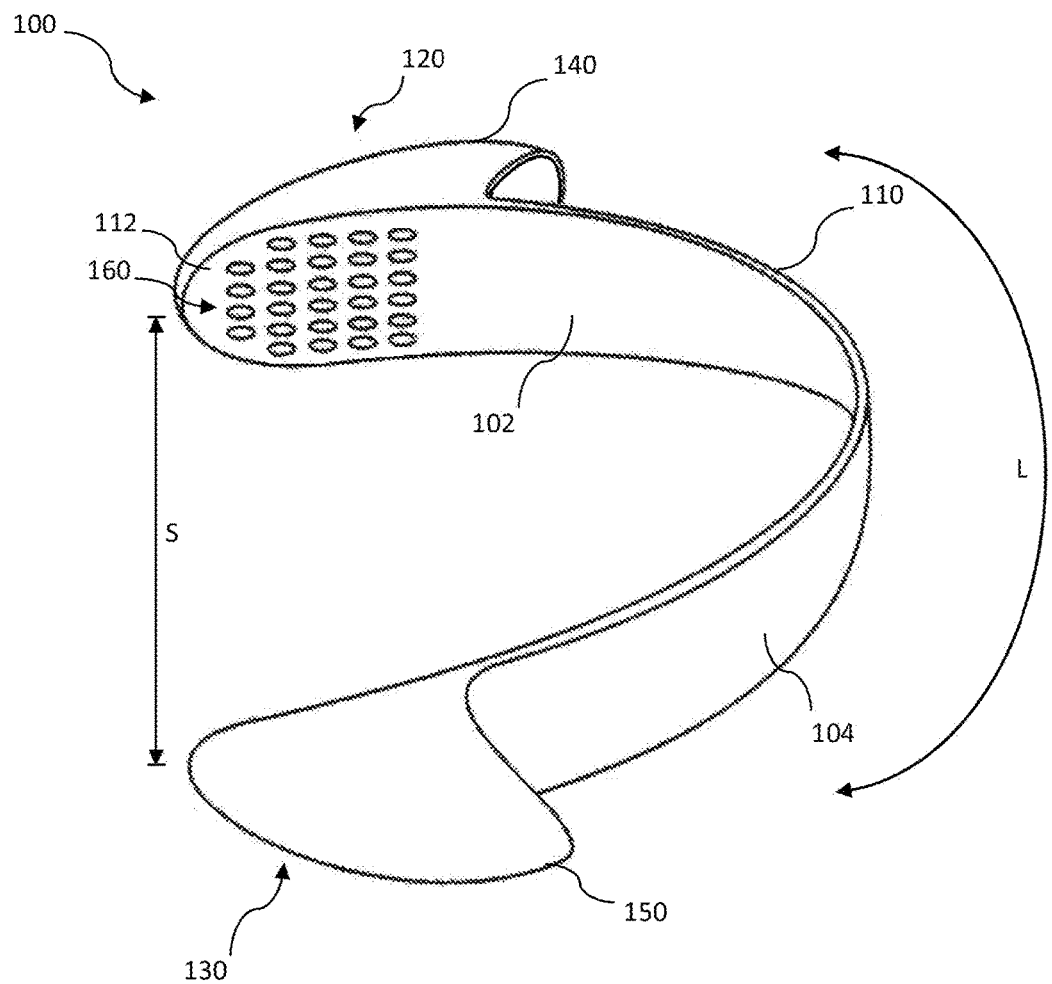
FIG. 1A is a schematic illustration of an exemplary embodiment of a device in a curved configuration.
Figure 1B:
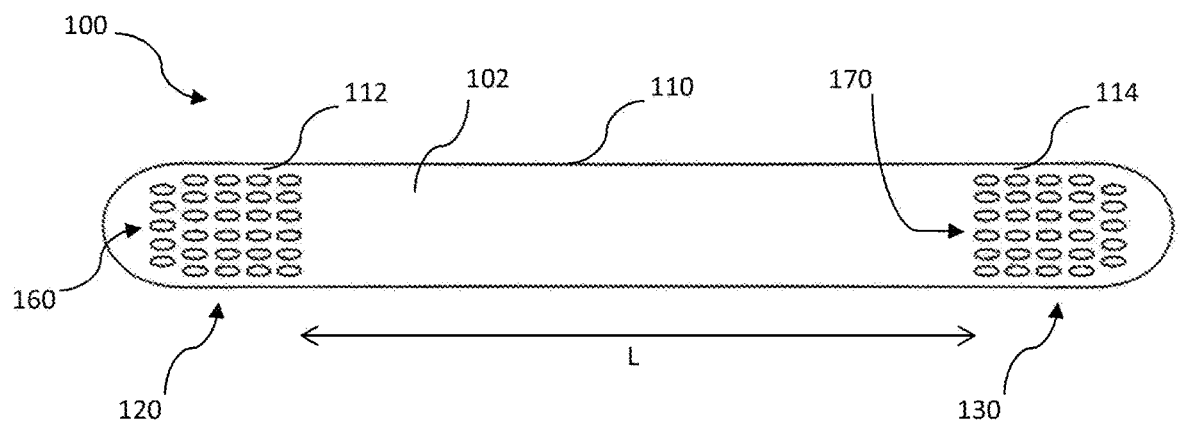
FIG. 1B is a schematic illustration of an exemplary embodiment of a device in a straight configuration.

FIGS. 1A and 1B shows exemplary embodiments of a grating device 100. In an exemplary embodiment, a grating device 100 includes a band 110. The band 110 extends in a longitudinal direction L from a first end 120 to a second end 130, and possesses a first side 102 and a second side 104 opposing the first side 102. The first and second sides 102, 104 extend in the longitudinal direction L. The band 110 is flexible to vary a separation distance S between the first end 120 and the second end 130. The grating device 100 includes a first fingerhold 140, which is located at the first end 120 and is configured to receive a first finger of a user. The grating device 100 also includes a second fingerhold 150, which is located at the second end 130 and is configured to receive a second finger of the user. A first grating element 160 is located on (i.e., directly or indirectly on) the first side 102 and at the first end 120. The first and second fingerholds 140, 150 are configured to hold the first and second fingers of the user on (i.e., directly or indirectly on) the second side 104 of the band such that: (i) the separation distance S between the first and second ends 120, 130 of the band 110 decreases when the first and second fingers of the user are moved closer to one another, and (ii) the separation distance S between the first and second ends 120, 130 of the band 110 increases when the first and second fingers of the user are moved apart from one another. FIG. 1A shows a grating device 100 in a curved configuration, while FIG. 1B shows a grating device 100 in a straight configuration. In the curved configuration, the longitudinal direction L is curved. In the straight configuration, the longitudinal direction L is straight.

In an exemplary embodiment, the grating device 100 is curved (e.g., as in FIG. 1A) in a resting position (i.e., when no stress is being applied to the grating device 100). In an exemplary embodiment, a grating device 100 with a curved resting position can more easily receive the user's fingers while reducing the need for additional preparatory manipulations by the user (e.g., curving the band 110 manually before inserting fingers into the fingerholds 140, 150). In an exemplary embodiment, the grating device 100 is straight in the resting position (e.g., as in FIG. 1B). In an exemplary embodiment, a grating device 100 with a straight resting position can be stored in a more organized manner (e.g., in a drawer with other generally longitudinally extending objects such as knives and other cooking utensils). In an exemplary embodiment, a grating device 100 is selectively configurable in a curved or straight position (i.e., the grating device 100 has a variable/malleable resting position). In an exemplary embodiment, the grating device 100 has a static resting position.

An exemplary embodiment of the grating device 100 including first and second fingerholds 140, 150 at opposite ends of the band 110 is safer to operate than known mechanical graters. That is, the ends 120, 130 of the band 110 are configured to protect the user's fingers against contact with a grating element located at the opposite end of the band 110, which could lead to injury. Moreover, the user can easily control the amount of pressure applied to the item to be grated, for example, as a function of the hardness of the item to be grated, and as a function of the desired grating result. The user can also adjust the separation distance S between the ends 120, 130 to accommodate items of varying diameters/thicknesses. In addition, the user can apply greater pressure to the item to be grated, compared to conventional mechanical graters. This is because the user's fingers are located close to or directly above the part of the grating element contacting the item to be grated, thus lending greater mechanical advantage. Greater pressure can increase grating efficiency. Moreover, increased mechanical advantage can reduce the likelihood of hand and/or wrist strain. Furthermore, the increased grating control allows the user to produce flakes over a small surface area on a working space. For example, when grating a cinnamon stick, the user can hold the cinnamon stick in a substantially vertical orientation and move the grating device 100 against the cinnamon stick in a reciprocating manner so as to produce flakes over a small area directly beneath the cinnamon stick.

In an exemplary embodiment, the second side 104 of the band 110 is covered only by the first fingerhold 140 at the first end 120 and by the second fingerhold 150 at the second end 130.

In an exemplary embodiment, the band 110 is formed integrally from one piece of material. Alternatively, the band 110 is formed from various pieces of material. For example, a first portion at the first end 120, a second portion at the second end 130, and a separately formed third portion extending from the first portion to the second portion.

In exemplary embodiments, the second side 104 of the band 110 is uncovered over 20%-80% of the extent of the second side 104 in the longitudinal direction L. In exemplary embodiments, the second side 104 of the band 110 is uncovered over at least 50% of the extent of the second side 104 in the longitudinal direction L.

In an exemplary embodiment, the first fingerhold 140 overlaps the first grating element 160 in the longitudinal direction L, as shown for example in FIG. 1A. This increases the mechanical advantage of the user's finger over the first grating element 160.

As shown in FIG. 1B, an exemplary embodiment of a grating device 100 includes a second grating element 170 located on (i.e., directly or indirectly on) the first side 102 at the second end 130. A grating device 100 including a second grating element 170 can allow for faster grating operation. A second grating element 170 located at the second end 130 can also reduce the likelihood of slippage between the second end 130 and the item to be grated.

In an exemplary embodiment, the second fingerhold 150 overlaps the second grating element 170 in the longitudinal direction L. This increases the mechanical advantage of the user's finger over the second grating element 160.

In an exemplary embodiment, the first grating element 160 is located on (i.e., directly or indirectly on) a first surface portion 112 of the first side 102, and a part of the first surface portion 112 is located along an entire periphery of the first grating element 160. In an exemplary embodiment, the second grating element 170 is located on (i.e., directly or indirectly on) a second surface portion 114 of the first side 102, and a part of the second surface portion 114 is located along an entire periphery of the second grating element 170. As a result, the grating element is spaced from the periphery of the surface on which it is located, so as to reduce the likelihood of exposure of the grating element, which could lead to injury. This space can also be advantageous during the use of a grating device 100 comprising grating elements at both ends 120, 130 of the band 110. Specifically, the user can reduce the rate of grating by opting to use only one of the ends 120, 130 for grating while maintaining pressure on the item to be grated, by twisting the other end of the band 110 and rubbing the item to be grated with the space, and not the grating element, at a given end.

In exemplary embodiments, the first and/or second grating element(s) 160, 170 comprises one or more grating blades 162 (as shown for example in FIGS. 2A and 2C), and/or an abrasive material 164 (as shown for example in FIGS. 2B and 2D), and/or any other grating element known in the art. In exemplary embodiments, a grating blade 162 can include metal, plastic, resin, ceramic, or any other blade material suitable for grating. In exemplary embodiments, the first and/or second grating element(s) 160, 170 include(s) grating blades 162 of different shapes and/or sizes and/or materials. In exemplary embodiments, blades 162 of a grating element 160, 170 are oriented to cut in a direction transverse to the longitudinal direction L of the band 110. In exemplary embodiments, blades 162 are oriented at any desired angle relative to the longitudinal direction L of the band 110. In exemplary embodiments, blades 162 are oriented to cut in a direction perpendicular to the longitudinal direction L. In exemplary embodiments, blades 162 are oriented to cut in a direction parallel to the longitudinal direction L. In exemplary embodiments, blades 162 oriented at an angle relative to the longitudinal direction L facilitate a grating operation by which a user holds an elongated item to be grated in one hand and grates the item using the grating device 100 by moving the grating device 100 along the item.

In exemplary embodiments, the first and/or second grating element(s) 160, 170 comprise(s) a grater blade configuration suitable for grating/zesting food items. In exemplary embodiments, the first and/or second grating element(s) 160, 170 comprise(s) a blade configuration such as any of the blade configurations of the MICROPLANE® Graters, Zesters, Coarse Graters, Extra Coarse Graters, Fine Graters, Ribbon Graters, Shavers, Spice Graters, Star/Parmesan Graters, and/or Ultra Coarse Graters manufactured by MICROPLANE®, with corporate offices in Russellville, Ark., USA. In exemplary embodiments, the first and/or second grating element(s) 160, 170 comprise(s) a blade configuration such as any of the blade configurations of the OXO® Graters, Medium Graters, Coarse Graters, and/or Zesters manufactured by OXO®, headquartered in New York City, N.Y., USA.

Figure 2A:
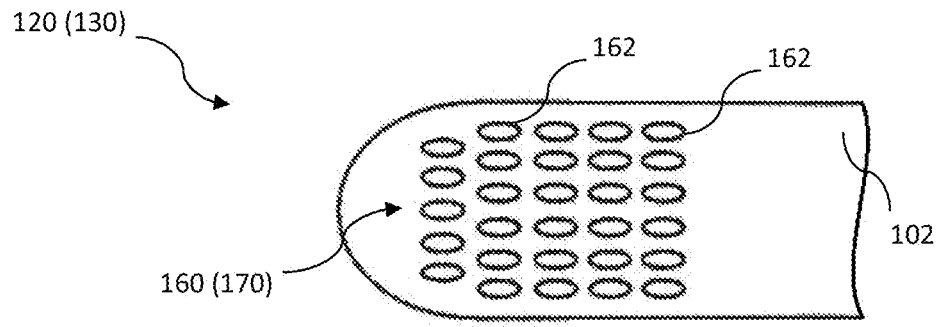
FIGS. 2A-D are schematic illustrations of portions of exemplary embodiments of grating devices including various types of grating elements.
Figure 2B:
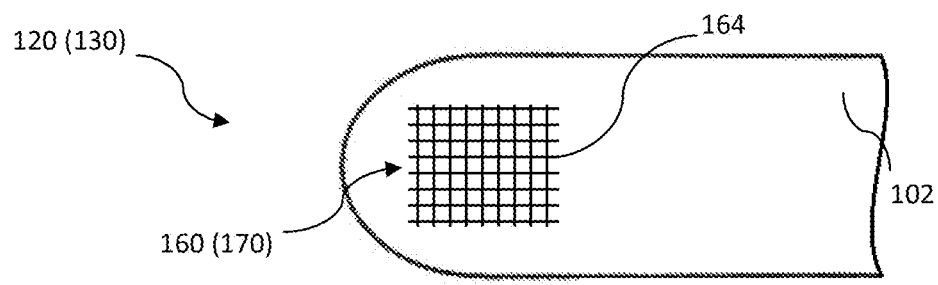
Figure 2C:
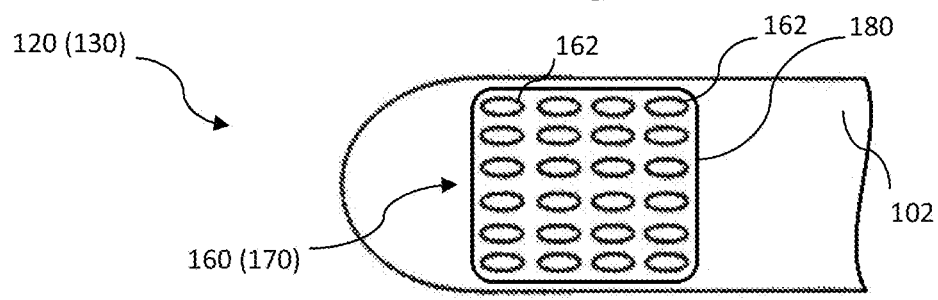
Figure 2D:
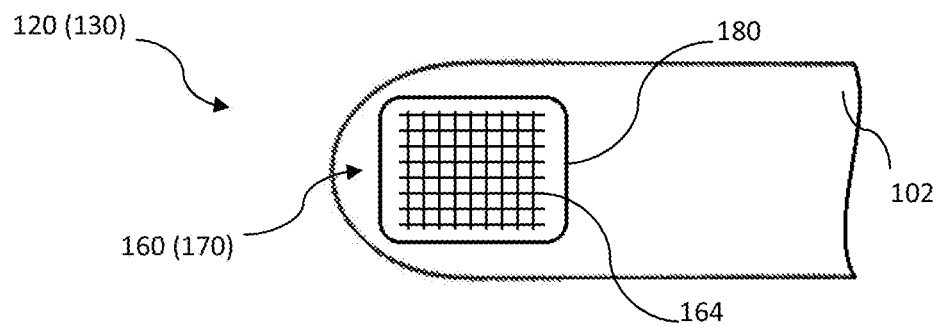

In an exemplary embodiment, the first and/or second grating element(s) 160, 170 is/are integral with or attached to the band 110 of the grating device 100, as shown for example in FIGS. 2A and 2B. In an exemplary embodiment, the grating element(s) 160, 170 is/are formed with the band 110. In an exemplary embodiment, the grating element(s) 160, 170 can be formed of the same material as the band 110. In an exemplary embodiment, the grating element(s) 160, 170 is/are attached to the band 110, for example, by being embedded into the band, fastened, adhered, fused, and/or attached by any other mechanism suitable to attach the grating element(s) 160, 170 to the band 110 such that the grating element(s) 160, 170 remain(s) attached to the band 110 during grating. In an exemplary embodiment, the first and/or second grating element(s) 160, 170 is/are formed on a grating element support 180 that is attached to the band 110 of the grating device 100, as shown for example in FIGS. 2C and 2D. The grating element support 180 can be embedded to the band 110, fastened, adhered, fused, and/or attached by any other mechanism suitable to attach the grating element support 180 to the band 110 such that the grating element support 180 remain(s) attached to the band 110 during grating.

In an exemplary embodiment, the first and/or second fingerholds 140, 150 include(s) a pocket 142 (as shown for example in FIG. 3A), and/or a strap 144 (as shown for example in FIG. 3B), and/or a flap 146 (as shown for example in FIG. 3C), and/or any other fingerhold suitable to receive a user's finger such that the user's finger remains in the fingerhold during grating. In an exemplary embodiment, the first and/or second fingerholds 140, 150 include(s) a gripping material so that the user's finger(s) are less susceptible to slipping out of the first and/or second fingerholds 140, 150, which could lead to injury (by contact with a grating element at the other end of the band 110). In an exemplary embodiment, the first and/or second fingerholds 140, 150 include(s) a stretchy material so as to accommodate differently sized fingers. First and/or second fingerholds 140, 150 including a stretchy material can be less susceptible to slippage of the user's finger(s) relative to the band 110, which could lead to injury.

Figure 3A:
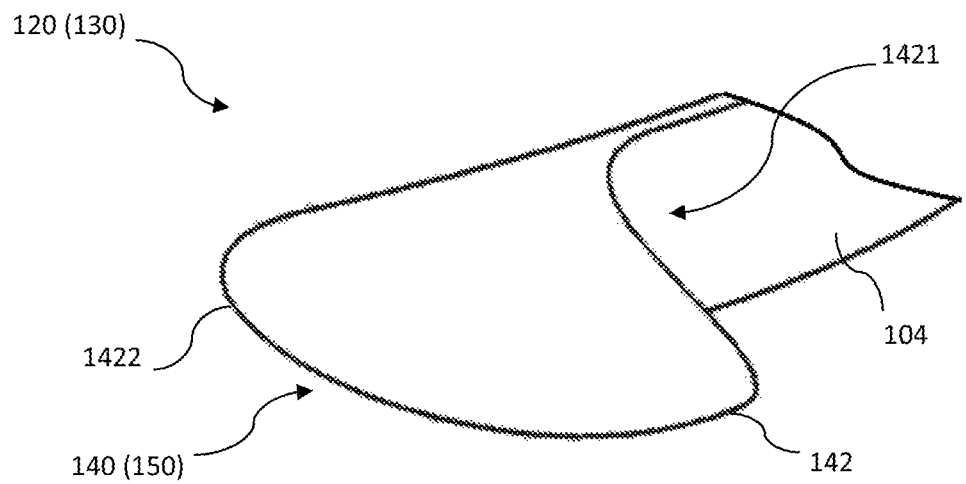
FIGS. 3A-C are schematic illustrations of portions of exemplary embodiments of grating devices including various types of fingerholds.

As shown for example in FIG. 3A, a pocket 142 includes an open end 1421 and a closed end 1422. One advantage of the pocket 142 is that the closed end 1422 protects the tip of the user's finger. That is, once inserted inside the pocket 142 at one end of the band 110, the user's finger is less susceptible to injury from a grating element located at the other end of the band 110.

Figure 3B:
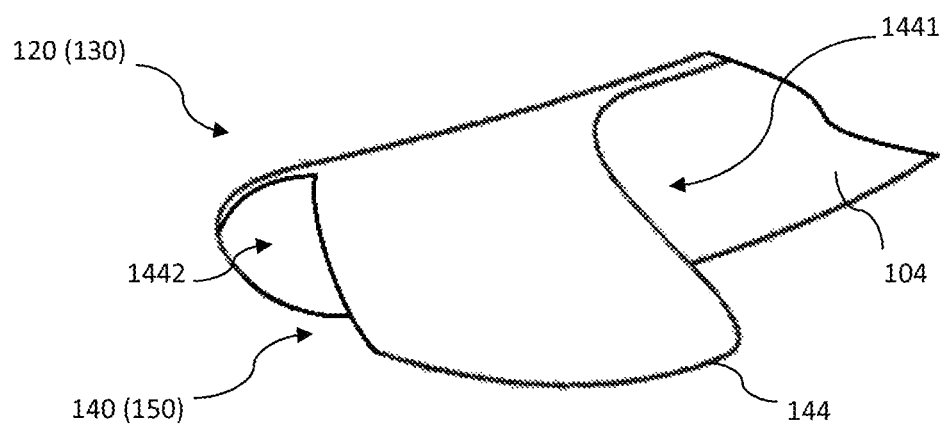

As shown for example in FIG. 3B, a strap 144 includes first and second open ends 1441, 1442. One advantage of the strap 144 is that a grating device 100 with the open end 1442 requires less material, and is thus less costly, than a grating device 100 with a pocket having a closed end. Moreover, the open end 1442 allows for enhanced breathability of the user's finger.

Figure 3C:
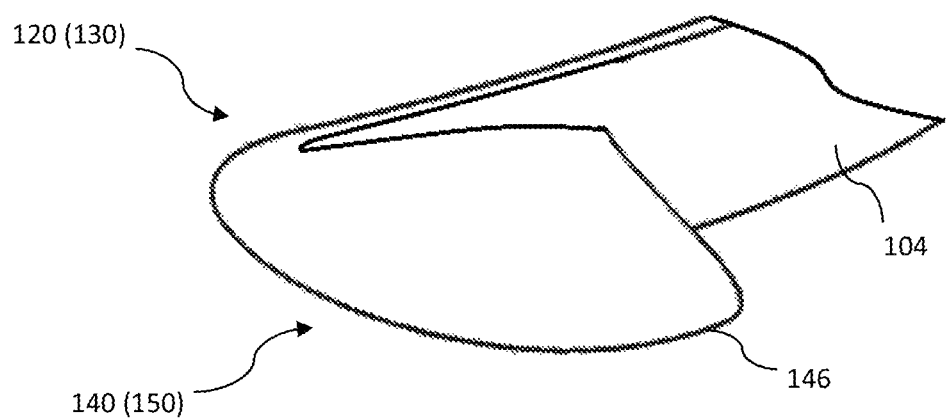

A flap 146, shown for example in FIG. 3C, is configured to receive the user's finger, which can be lodged between the flap 146 and the band 110 of the grating device 100. In an exemplary embodiment, the flap 146 is biased toward the band 110 so as to secure the user's finger, once received in the fingerhold.

During operation of an exemplary embodiment of a grating device 100, the user places first and second fingers in the first and second fingerholds 140, 150, respectively. The user decreases the separation distance S between the first and second ends 120, 130 of the band 110 by moving the first and second fingers closer to one another until the first grating element 160 makes contact with a first surface of an item to be grated. The user moves the grating device 100 along the surface of the item to be grated. The user increases the separation distance S by moving the first and second fingers apart from one another.

An exemplary embodiment of a device 100 includes a band 110. The band 110 extends in a longitudinal direction L from a first end 120 to a second end 130, and possesses a first side 102 and a second side 104 opposing the first side 102, as shown for example in FIGS. 1A and 1B. The first and second sides 102, 104 extend in the longitudinal direction L. The band 110 is flexible to vary a separation distance S between the first end 120 and the second end 130. The device 100 includes a first fingerhold 140 located at the first end 120 and configured to receive a first finger of a user, and a second fingerhold 150 located at the second end 130 and configured to receive a second finger of the user. The first and second fingerholds 140, 150 are configured to hold the first and second fingers of the user on (i.e., directly or indirectly on) the second side 104 of the band such that (i) the separation distance S between the first and second ends 120, 130 of the band 110 decreases when the first and second fingers of the user are moved closer to one another, and (ii) the separation distance S between the first and second ends 120, 130 of the band 110 increases when the first and second fingers of the user are moved apart from one another. In exemplary embodiments, a device 100 is formed of various materials or fitted with various materials at one or both ends 120, 130 and can be used for various applications, such as, but not limited to, grating, rubbing, filing, sanding, grinding, abrading, scratching, eroding, scraping, rasping, or polishing. An exemplary embodiment of such device 100 can provide more precision, control and breathability, can be less cumbersome to use, and can require less storage space than conventional apparatuses.

It will be appreciated by those skilled in the art that the disclosure herein can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A grating device comprising:
   a band extending in a longitudinal direction from a first end to a second end, the band possessing a first side and a second side opposing the first side, the first and second sides extending in the longitudinal direction, the band being flexible to vary a separation distance between the first end and the second end;
   a first fingerhold located at the first end and configured to receive a first finger of a user;
   a second fingerhold located at the second end and configured to receive a second finger of the user; and
   a first grating element located on the first side and at the first end of the band,
   the first and second fingerholds being configured to hold the first and second fingers of the user on the second side of the band such that: (i) the separation distance between the first and second ends of the band decreases when the first and second fingers of the user are moved closer to one another, and (ii) the separation distance between the first and second ends of the band increases when the first and second fingers of the user are moved apart from one another.

2. The grating device of claim 1, wherein the first grating element comprises one or more grating blades.

3. The grating device of claim 1, wherein the second side of the band is covered only by (i) the first fingerhold at the first end and (ii) the second fingerhold at the second end.

4. The grating device of claim 1, wherein the first fingerhold overlaps the first grating element in the longitudinal direction.

5. The grating device of claim 1, wherein the first grating element comprises an abrasive material.

6. The grating device of claim 1, wherein the first grating element is located on a first surface portion of the first side, and a part of the first surface portion of the first side is located along an entire periphery of the first grating element.

7. The grating device of claim 1, wherein the first fingerhold comprises a pocket.

8. The grating device of claim 1, wherein the first and second fingerholds each comprise any one from the set of: a pocket; a strap; and a flap.

9. The grating device of claim 1, wherein the first grating element is formed on a grating element support attached to the band.

10. The grating device of claim 1, wherein the first and second fingerholds cover at most 50% of an entire extent of the second side in the longitudinal direction.

11. The grating device of claim 1, further comprising:
    a second grating element located on the first side at the second end of the band.

12. The grating device of claim 11, wherein the second grating element comprises one or more grating blades.

13. The grating device of claim 11, wherein the second grating element comprises an abrasive material.

14. The grating device of claim 1, wherein the band extends along a curved path in a resting position of the grating device.

\* \* \* \* \*